May 5, 1953

P. H. STANLEY 2,637,405

LIGHTWEIGHT STRUCTURE FOR AIRCRAFT
SUSTAINING ROTOR BLADES

Filed March 22, 1947

INVENTOR
Paul H. Stanley
BY
ATTORNEYS

May 5, 1953  P. H. STANLEY  2,637,405
LIGHTWEIGHT STRUCTURE FOR AIRCRAFT
SUSTAINING ROTOR BLADES
Filed March 22, 1947  2 SHEETS—SHEET 2
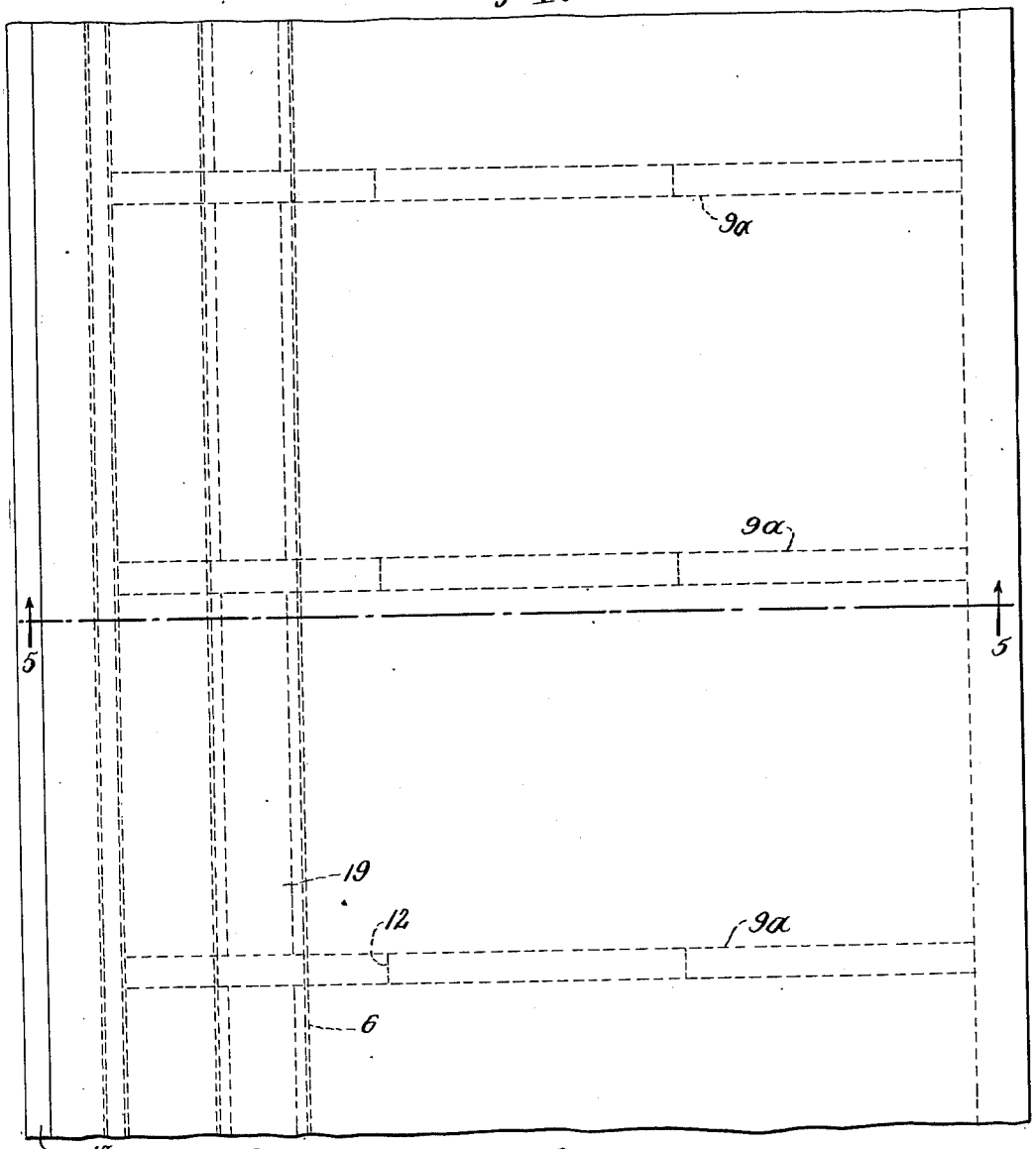
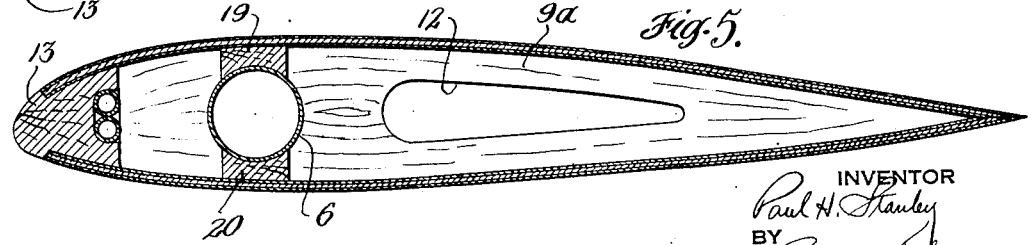
INVENTOR
Paul H. Stanley
BY
ATTORNEYS Patented May 5, 1953

2,637,405

UNITED STATES PATENT OFFICE 2,637,405

LIGHTWEIGHT STRUCTURE FOR AIRCRAFT SUSTAINING ROTOR BLADES

Paul H. Stanley, Huntingdon Valley, Pa., assignor to Autogiro Company of America, Philadelphia, Pa., a corporation of Delaware Application March 22, 1947, Serial No. 736,459

4 Claims. (Cl. 170—159)

This invention relates to the construction of rotor blades for air rotors and is especially adapted to, and useful in, aircraft sustaining rotors, for instance, the sustaining rotor of a helicopter.

One of the primary objects of the invention is to provide a rotor blade having an exceptionally favorable combination of strength and weight characteristics.

Another object of the invention is to improve rotor blade structure from the standpoint of materials used, the invention making possible the employment of relatively inexpensive and readily available materials.

The invention further simplifies fabrication of rotor blades.

In accordance with another aspect of the invention, the centrifugal loads on various parts of the blade, such as the blade skin and ribs, are transferred to the blade spar without necessitating piercing or welding of the spar, with the result that the problem of breakage of spars because of fatigue is reduced.

How the foregoing and other objects and advantages are attained will appear more fully from the following description referring to the accompanying drawings, in which—

Figure 4 is a plan view of a portion of a blade constructed according to a second embodiment of the invention; and Figure 5 is a chordwise sectional view taken as indicated by the line 5—5 on Figure 4.

Figure 1:
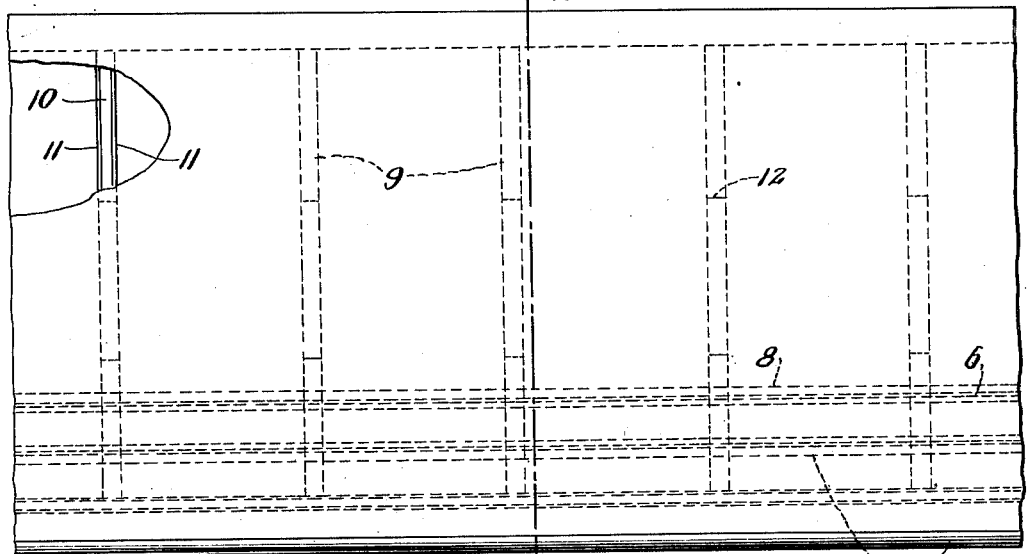
Figure 1 is a plan view of a portion of a rotor blade constructed according to one embodiment of the invention.

The blade of Figure 1 incorporates a tubular metallic spar 6 which constitutes the primary longitudinal strength structure of the blade, this spar being adapted to be connected at its root end with a rotative hub, for instance, by means of blade pivots providing for movement of the blade in the flapping sense, in the pitch change sense and/or in other senses, according to the type of rotor operation desired.

At the front and rear of the spar 6, shear strips 7 and 8 are arranged, these strips being extended preferably throughout the length of the spar and being adhesively secured to the spar. Advantageously these strips are made of wood, such as spruce or bass.

The blade further incorporates a plurality of ribs 9 which are apertured to pass the assembly of spar 6 and shear strips 7 and 8, the ribs being adhesively secured to the shear strips and preferably also to the spar tube itself. Each rib is desirably of laminated construction, being made up of a core of lightweight expanded or porous material such as expanded cellulose acetate, or of balsa wood (which is also essentially a lightweight porous material). Such a core is indicated at 10 in the upper left corner of Figure 1. The ribs further include thin plies or veneers of wood such as bass wood indicated at 11. The core 10 and the plies 11—11 are of course adhesively secured to each other. This provides a lightweight rib which may be even further lightened by a cut-out in the region to the rear of the spar as indicated at 12 in Figure 2. The use of such relatively lightweight ribs is made possible, in large part, because of the exceptionally lightweight blade skin employed, as described hereinafter.

The blade also incorporates a leading edge or nose piece 13 which preferably extends substantially throughout the length of the blade and is adhesively secured to the forward ends of the transverse ribs 9. This leading edge piece is desirably made of wood, for instance, bass or spruce.

The parts of the blade thus far described may be assembled, for instance in a jig, and after appropriate gluing, the blade skeleton thus formed may be covered with the skin. In the preferred form of the invention, the skin is of laminated construction, comprising a lightweight porous core 14 with outer and inner surfacing sheets 15 and 16 (see Figure 3). Various materials may be used for the surfacing sheets 15 and 16, such as thin plies of wood or certain fabrics, for instance glass fibre fabric. Indeed, for very light construction, the invention contemplates employing paper sheets, for example, kraft paper of about .004" in thickness. In preferred embodiments the surfacing sheets of the blade skin are made of materials such as fabrics or absorbent paper so that the surfacing sheets may be both impregnated with and bonded to the porous core by means of a single adhesive or impregnant, such as a thermosetting resin. In this way a tough waterproof construction is provided.

Figure 2:
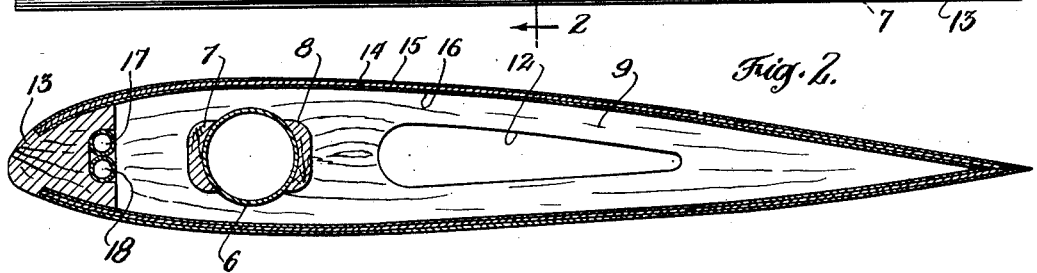
Figure 2 is a chordwise sectional view, on an enlarged scale, taken as indicated by the section line 2—2 on Figure 1.

As best seen in Figure 2, the invention contemplates that the blade skin be formed in two portions, i. e., upper and lower halves, the trailing edges thereof being bevelled to the rear of the ribs 9 so as to mate with each other and provide substantial gluing area. At the nose of the blade, the nose piece 13 is shouldered at both its upper and lower sides along lines extending lengthwise of the blade so as to interfit with the forward edges of the upper and lower blade skin elements. In the preferred practice of the invention, the blade skin halves are preformed to the desired airfoil contours and are then applied to the previously assembled skeleton structure consisting of the spar, shear strips, nose piece and ribs. The skin elements are then adhesively secured in place, i. e., are glued to the nose strip and ribs, and also to each other at the trailing edge.

According to the foregoing an exceedingly light and yet quite strong blade structure is provided, the shear strips serving to carry at least a major portion of the centrifugal load of the ribs and skin as well as of the nose piece 13. As compared with a similar blade made up with conventional plywood ribs and plywood blade covering, the weight of the blade superstructure (all parts of the blade except the spar), according to the present invention need not be more than about 30% that of the more conventional structure.

Figure 3:
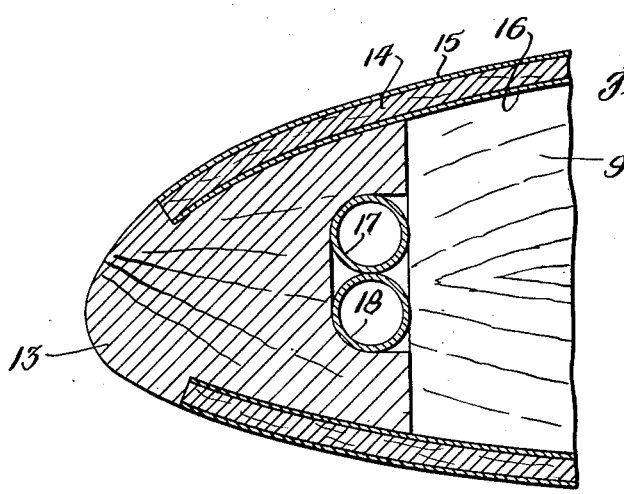
Figure 3 is a further enlarged fragmentary sectional view of the nose portion of the blade shown in Figures 1 and 2.

The employment of the wood nose piece 13 aids in providing a desirable location of the chordwise center of gravity of the blade, it being desirable in most blades of the sustaining rotor type to provide a mass distribution such that the chordwise center of gravity lies along a line at approximately 25% of the chord dimension from the leading edge. The spar and the chordwise center of pressure, in many blades, are also desirably located along this 25% line. The nose piece, moreover, constitutes an element which may readily be drilled to receive ballast weights, where that is desired in order to provide a chordwise center of gravity well forward in the blade. It is also contemplated according to the invention that the rear face of the nose piece 13 may be recessed as shown in Figures 2 and 3 in order to receive conduits such as those illustrated at 17 and 18, which may be employed in a blade of the type adapted to be driven by a fluid jet carried at the blade tip, for instance in a jet drive system such as disclosed in my copending application Serial No. 650,213, filed February 26, 1946 which issued on June 24, 1952 as Patent 2,601,463. Such conduits, where used, should be adhesively secured in place.

An important point to note in connection with the blade construction described above is that the assembly and securing of the ribs to the spar does not require piercing or welding of the spar. The shear strips 7 and 8, having extended surface engagement with the spar and being adhesively secured thereto throughout such extended surface engagement constitute an effective means for transferring the major centrifugal loads from the remainder of the blade structure to the spar. Moreover, it is particularly advantageous to form the shear strips of wood, since this facilitates the gluing of the ribs thereto and enhances the adhesive bond between the ribs and shear strips.

With regard to the structure of the blade skin, it is to be noted that for the core I prefer to employ a light porous wood such as balsa wood, although other light porous materials may also be utilized, for instance certain expanded plastics of highly cellular structure. Moreover, while paper sheets are preferred at the outer and inner surfaces of the core, certain other sheet or fabric type materials may be substituted, such as doped or resin-impregnated fabrics, for instance fibre glass fabrics.

In the case of the ribs 9, balsa wood is preferred as the core, although here again other highly cellular materials may be substituted, such as certain of the expanded plastics or resins.

In securing the various elements of the blade to each other, glue may be employed as the adhesive or if desired the adhesive may be of certain other types, such as that commonly known as the rubber cement type, for example, cyclized material known to the trade as "Cycleweld No. 4624" (a product of the E. I. du Pont de Nemours & Co.).

In the embodiment of Figures 4 and 5, many of the elements are similar to those described above. Thus the blade here shown includes a spar 6, a nose piece 13, ribs 9a and upper and lower skin elements constructed and applied as described above with reference to the first form.

In the arrangement of Figures 4 and 5, however, the wood shear members which are adhesively secured to the spar 6 are located above and below the spar as indicated at 19 and 20. These strips, moreover, are sectionalized lengthwise of the blade, each section lying between a pair of adjacent ribs as clearly appears from Figure 4, so that the ribs need only be cut out to pass the spar itself. In this arrangement the shear strips also serve to transmit centrifugal load from the ribs to the spar. While it might not always be necessary, the ribs are desirably adhesively secured to the shear strips.

As clearly appears in Figure 5 the upper and lower shear strips 19 and 20 fill the space between the spar tube and the inner surface of the blade skin and the invention contemplates that in this form the blade skin be directly glued to the shear strips in addition to being adhesively secured to the ribs. This arrangement thus provides for direct transmission of a portion of the centrifugal load on the skin to the shear strips (and from the shear strips to the spar). With both forms of construction described it is possible to fabricate air rotor blades having exceptionally favorable relation of blade weight to blade strength.

The various features hereinabove described are of especial advantage in aircraft sustaining rotors as their construction and operation present unusual and exceptionally severe problems.

I claim:

1. An air rotor blade of substantially hollow and light-weight construction, comprising a largely hollow spar extending lengthwise of the blade, positioned to carry directly axially the centrifugal load of the blade and proportioned to carry said load and the major bending loads on the blade, a largely porous airfoil shell with reinforcing lamina, and a plurality of largely porous stiffeners having reinforcing lamina, said stiffeners being located at intervals along the blade and interconnecting said spar and shell.

2. The blade of claim 1 wherein the spar is of metal and a shear element is bonded thereto and secured to said stiffeners.

3. An air rotor blade comprising a spar, a plurality of transverse ribs apertured to pass the spar, a sectionalized shear strip having its sections extended lengthwise of the spar between adjacent ribs, the shear strip being secured to the spar and each section thereof being positioned between adjacent ribs and thus serving to transmit centrifugal load from the rib at the inboard end thereof to the spar, and a blade skin secured to the ribs.

4. A construction according to claim 3 in which the shear strip lies between the spar and the blade skin and in which the blade skin is secured to the shear strip between adjacent ribs.

PAUL H. STANLEY.

References Cited in the file of this patent

UNITED STATES PATENTS

| Number | Name | Date |
|---|---|---|
| 1,429,600 | Ludin | Sept. 19, 1922 |
| 1,444,959 | Dickey | Feb. 13, 1923 |
| 1,282,940 | Sundstedt | Sept. 15, 1931 |
| 1,969,781 | Cierva | Aug. 14, 1934 |
| 2,067,228 | Bennett | Jan. 12, 1937 |
| 2,070,657 | Hafner | Feb. 16, 1937 |
| 2,152,861 | Bennett | Apr. 4, 1939 |
| 2,155,375 | Jablonsky | Apr. 18, 1939 |
| 2,243,432 | Mautner | May 27, 1941 |
| 2,272,439 | Stanley | Feb. 10, 1942 |
| 2,303,707 | Pullin | Dec. 1, 1942 |
| 2,414,125 | Rheinfrank | Jan. 14, 1947 |

FOREIGN PATENTS

| Number | Country | Date |
|---|---|---|
| 838,828 | France | Dec. 16, 1938 |